(12) United States Patent
Miwa et al.

(10) Patent No.: US 7,067,768 B2
(45) Date of Patent: Jun. 27, 2006

(54) MOTOR DRIVEN RESISTANCE SPOT WELDING GUN

(75) Inventors: Hiroshi Miwa, Utsunomiya (JP);
Shigemitsu Nakabayashi, Tochigi-ken (JP); Hitoshi Sasaki, Tokyo (JP);
Masaaki Shoji, Tochigi-ken (JP);
Hiroki Hashimoto, Saitama-ken (JP);
Osamu Kurihara, Higashikurume (JP);
Takuro Kugimiya, Saitama (JP);
Akiyoshi Shimizu, Tochigi-ken (JP);
Shigenori Yoshimi, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 33 days.

(21) Appl. No.: 10/478,015

(22) PCT Filed: May 17, 2002

(86) PCT No.: PCT/JP02/04786

§ 371 (c)(1),
(2), (4) Date: May 24, 2004

(87) PCT Pub. No.: WO02/094496

PCT Pub. Date: Nov. 28, 2002

(65) Prior Publication Data

US 2004/0208031 A1 Oct. 21, 2004

(30) Foreign Application Priority Data

| May 18, 2001 | (JP) | ........................ 2001-149984 |
| May 18, 2001 | (JP) | ........................ 2001-149986 |
| May 18, 2001 | (JP) | ........................ 2001-150016 |
| May 18, 2001 | (JP) | ........................ 2001-150039 |
| May 18, 2001 | (JP) | ........................ 2001-150047 |

(51) Int. Cl.
*B23K 9/12* (2006.01)
*B23K 9/10* (2006.01)
*H02K 7/14* (2006.01)
*H02K 9/00* (2006.01)

(52) U.S. Cl. ................. 219/137.62; 219/137.31; 310/50; 310/54

(58) Field of Classification Search ............ 363/141; 219/136, 137 PS, 137.2, 137.31, 137.62; 310/46, 47, 50, 52, 54, 58–61, 60 A
See application file for complete search history.

(56) References Cited

U.S. PATENT DOCUMENTS 3,621,182 A * 11/1971 Peyrot et al. ............. 219/60.2
3,775,584 A * 11/1973 Moerke ................. 219/137.63

(Continued)

FOREIGN PATENT DOCUMENTS

EP  0 799 672 A1  10/1997

(Continued)

*Primary Examiner*—Matthew V. Nguyen
(74) *Attorney, Agent, or Firm*—Birch, Stewart, Kolasch & Birch, LLP

(57) ABSTRACT

A motor-driven welding gun has a servomotor for displacing a movable electrode tip toward and away from a fixed electrode tip. The servomotor has a motor housing with a copper pipe which is inserted therein when the motor housing is cast. The copper pipe provides a coolant passage in the motor housing for supplying a coolant therethrough. When the coolant passage is supplied with the coolant, the motor housing is forcibly cooled, reducing the amount of heat generated by the servomotor.

7 Claims, 12 Drawing Sheets

U.S. PATENT DOCUMENTS

| | | | |
|---|---|---|---|
| 3,844,177 A | | 10/1974 | Bourassa |
| 3,956,650 A | | 5/1976 | Field, II |
| 4,864,099 A | * | 9/1989 | Cusick et al. .......... 219/137.62 |
| 5,491,321 A | * | 2/1996 | Stuart et al. ........... 219/137.61 |
| 5,510,958 A | | 4/1996 | Shimabara et al. |
| 5,930,135 A | | 7/1999 | Janko |
| 6,222,289 B1 | | 4/2001 | Adames |
| 6,525,297 B1 | * | 2/2003 | Doherty ................. 219/137.31 |

FOREIGN PATENT DOCUMENTS

| | | |
|---|---|---|
| EP | 0 895 337 A1 | 2/1999 |
| EP | 1 057 569 A1 | 12/2000 |
| JP | 59-89674 | 6/1984 |
| JP | 60-1591 | 1/1985 |
| JP | 7-111759 A | 4/1995 |
| JP | 07-124752 A | 5/1995 |
| JP | 7-164155 A | 6/1995 |
| JP | 7-241065 A | 9/1995 |
| JP | 7-290251 A | 11/1995 |
| JP | 07-290251 A | 11/1995 |
| JP | 11-197843 A | 7/1999 |
| JP | 2000-94143 A | 4/2000 |
| JP | 2000-116103 A | 4/2000 |
| JP | 2000-210779 A | 8/2000 |
| JP | 2000-343231 A | 12/2000 |

* cited by examiner

MOTOR DRIVEN RESISTANCE SPOT WELDING GUN

This application is the national phase under 35 U.S.C. § 371 of PCT International Application No. PCT/JP02/04786 which has an International filing date of May 17, 2002, which designated the United States of America.

TECHNICAL FIELD

The present invention relates to a motor-driven welding gun having a pair of electrode tips and a feed screw mechanism coupled to a servomotor for moving one of the electrode tips toward and away from the other electrode tip.

BACKGROUND ART

Spot-welding guns are used to weld overlapping metal sheets, for example. Usually, such welding guns comprise air-operated or motor-driven servo welding guns capable of simplifying the controlling of the opening between a pair of electrode tips.

Generally, a motor-driven welding gun which is a motor-driven servo welding gun comprises a servomotor, a pair of electrode tips, and a feed screw mechanism coupled to the servomotor for moving one of the electrode tips with respect to the other. Workpieces to be welded to each other are sandwiched between the electrode tips. While the workpieces are being pressed by electrode tips operated by the servomotor, an electric current is passed through the workpieces to weld the workpieces to each other. The motor-driven welding gun is thus easily capable of welding workpieces even when they have a different thickness or a different number of workpieces are put together in overlapping relation.

In order to increase the strength of workpieces to be welded, it is desirable to increase the thickness of the workpieces and to overlap the workpieces in a complex configuration. It is also desirable to reduce strains produced when the workpieces are pressed. To meet these demands, it is necessary to increase the torque generated by the motor-driven welding gun.

For reducing the manufacturing cost of welded products, it is necessary to use the motor-driven welding gun at an increased ratio so as to increase a facility usage ratio for higher productivity.

When the torque and usage ratio of the motor-driven welding gun is increased, however, the amount of heat generated by the servomotor is also increased. Therefore, the servomotor needs to have an increased wall thickness and an increased size, and an add-on cooling structure needs to be mounted on the servomotor, resulting in a considerable increase in the manufacturing cost of the motor-driven welding gun.

Attempts to increase the torque of the motor-driven welding gun result in a considerable increase in the radial size of the servomotor, making the servomotor heavy. The large and heavy servomotor is liable to reduce the efficiency with which to operate the motor-driven welding gun. If the rotor of the servomotor has a larger weight and diameter, then the servomotor produces a larger centrifugal force when the rotor rotates, lowering the speed at which the electrode tips move toward and away from each other, with the result that the efficiency of the spot-welding operation is reduced.

For speeding up the welding operation, it is desirable to increase the ease with which to move the motor-driven welding gun. Such a demand can be met by reducing the weight and size of the motor-driven welding gun.

The feed screw mechanism has a feed screw coupled for corotation with the rotor of the servomotor. The surface pressure acting between the rotor and the feed screw needs to be kept at a certain level or higher in order to increase the torque of the servomotor, reduce the size of the servomotor, and prevent the rotor and the feed screw from slipping at their joint.

To satisfy the above requirements and avoid the above drawbacks, there is known a motor-combined drive unit in a motor-driven welding gun as disclosed in Japanese laid-open patent publication No. 2000-343231, for example. According to the disclosed motor-combined drive unit, a power lock mechanism based on the wedging action of inner and outer rings is disposed between a ball screw and a motor shaft. The ball screw is fixed to the motor shaft by the power lock mechanism.

With the power lock mechanism, however, the motor-combined drive unit is made up of an increased number of parts. Therefore, the motor-driven welding gun is complex in structure, and is manufactured at a considerably high cost.

When workpieces are spot-welded by the motor-driven welding gun, since a large current flows between the electrode tips, a welding gun assembly and the electrode tips are required to be forcibly cooled. The welding gun assembly and the electrode tips are cooled by cooling water which flows through cooling water passages that are incorporated in the welding gun assembly and the electrode tips.

The above cooling structure tends to cause a water leakage in the servomotor when the electrode tips are replaced or due to aging of the seal at the cooling water inlet in the welding gun assembly. When the cooling water leaks, it enters the coils in the servomotor or an encoder coupled to the servomotor, resulting in an insulation failure, an electric short circuit, or a rust-caused contact failure, which makes it difficult or impossible for the servomotor to achieve its desired performance.

Because the electrode tips of the motor-driven welding gun are opened and closed or their opening is controlled by the servomotor, if the servomotor fails to perform its controlling operation properly, then the electrode tips may fail to be opened or closed properly. Particularly, if electrode tips fail to be opened properly, a nut holding one of the electrode tips hits the rotor, applying an impact load to the joint between the rotor and the feed screw. Therefore, the rotor and the feed screw slip against each other in their joint, and tend to be damaged.

DISCLOSURE OF INVENTION

It is a general object of the present invention to provide a motor-driven welding gun which is capable of producing a high torque, being used at a high ratio, and being easily reduced in size.

A major object of the present invention is to provide a motor-driven welding gun which is capable of producing a high torque and being operated with an increased efficiency.

Another major object of the present invention is to provide a motor-driven welding gun which is simple in arrangement and inexpensive and which is capable of producing a high torque and being easily reduced in size.

Still another major object of the present invention is to provide a motor-driven welding gun which is simple in arrangement and which is capable of reliably preventing water from entering a servomotor thereof.

Yet another major object of the present invention is to provide a motor-driven welding gun which does not produce an impact when electrode tips are opened and closed, which is capable of reliably performing stable welding operation, and which is simple in arrangement.

According to the present invention, a motor-driven welding gun has a pair of electrode tips, a servomotor, a feed screw mechanism coupled to the servomotor and rotatable thereby for moving one of the electrode tips toward and away from the other electrode tip, the servomotor having a motor housing having a coolant passage defined therein for supplying a coolant therethrough.

Since the servomotor is effectively cooled by the coolant, if the motor-driven welding gun is designed to produce a higher torque and is used at a higher ratio, the servomotor does not produce an increased amount of heat, can be reduced in size and weight, and does not require any add-on cooling structure, resulting in a reduction in the cost of the facility of the motor-driven welding gun. When the motor-driven welding gun is used at a higher ratio, the facility of the motor-driven welding gun can be reduced, and takes up a reduced space.

According to the present invention, another motor-driven welding gun has a pair of electrode tips, a servomotor, and a feed screw mechanism coupled to the servomotor and rotatable thereby for moving one of the electrode tips toward and away from the other electrode tip, the servomotor having a hollow rotor rotatably housed in the motor housing, and a magnet fixed to the hollow rotor, the magnet having a constant radial dimension and a constant thickness regardless of the magnitude of the output power of the servomotor, the magnet having an axial dimension along the axis of the hollow rotor, which is substantially proportional to the magnitude of the output power of the servomotor. The servomotor also has a stator which includes a coil having an axial dimension which is commensurate with the axial dimension of the magnet which is disposed in confronting relation to the coil.

If the servomotor is designed for a higher torque, the radial dimension of the servomotor is not increased, and centrifugal forces produced when the servomotor is rotated may be held to a level which is substantially the same as those produced by a servomotor which produces an ordinary torque, i.e., a servomotor which is used in general spot welding applications. Therefore, the servomotor can be rotated at a higher speed for an increased output power, allowing the electrode tips to move toward and away from each other at a higher speed. Thus, the cycle time of spot-welding operation of the motor-driven welding gun can effectively be reduced.

According to the present invention, still another motor-driven welding gun has a pair of electrode tips, a servomotor, and a feed screw mechanism coupled to the servomotor and rotatable thereby for moving one of the electrode tips toward and away from the other electrode tip, the servomotor having a hollow rotor, and the feed screw mechanism having a feed screw, the hollow rotor and the feed screw being integrally joined to each other by an interfitting fastening structure.

Since the hollow rotor and the feed screw are firmly fastened to each other, no slippage occurs between the hollow rotor and the feed screw when the servomotor is designed for a higher torque. The servomotor can thus easily be designed for a higher torque and reduced in size with a simple and compact arrangement.

According to the present invention, yet another motor-driven welding gun has a pair of electrode tips, a servomotor, and a feed screw mechanism coupled to the servomotor and rotatable thereby for moving one of the electrode tips toward and away from the other electrode tip, the servomotor having a motor housing and a hollow rotor rotatably housed in the motor housing, and a seal member interposed between the motor housing and the hollow rotor and disposed on an open end that faces the electrode tips.

When the electrode tips are replaced with new ones, cooling water is effectively prevented by the seal member from entering into the motor housing through a region between the motor housing and the hollow rotor. Because cooling water is prevented from entering into the coil and encoder of the servomotor by the simple arrangement, the servomotor can reliably achieve its desired performance.

According to the present invention, yet still another motor-driven welding gun has a pair of electrode tips, a servomotor, and a feed screw mechanism coupled to the servomotor and rotatable thereby for moving one of the electrode tips toward and away from the other electrode tip, the servomotor having a hollow rotor, the feed screw mechanism having a nut, and a damping member disposed in a region of contact between the hollow rotor and the nut, for absorbing shocks produced between the nut and the hollow rotor when the one of the electrode tips is moved away from the other electrode tip.

When the nut is moved toward the hollow rotor to displace the one of the electrode tips away from the other electrode tip, the damping member absorbs shocks applied between the nut and the hollow rotor, thus preventing an impact load from being applied to the joint between the feed screw and the hollow rotor. It is thus possible to reliably prevent, with a simple arrangement, the joint between the feed screw and the hollow rotor from slipping and being damaged.

The above and other objects, features, and advantages of the present invention will become more apparent from the following description when taken in conjunction with the accompanying drawings in which preferred embodiments of the present invention are shown by way of illustrative example.

BEST MODE FOR CARRYING OUT THE INVENTION

Figure 1:
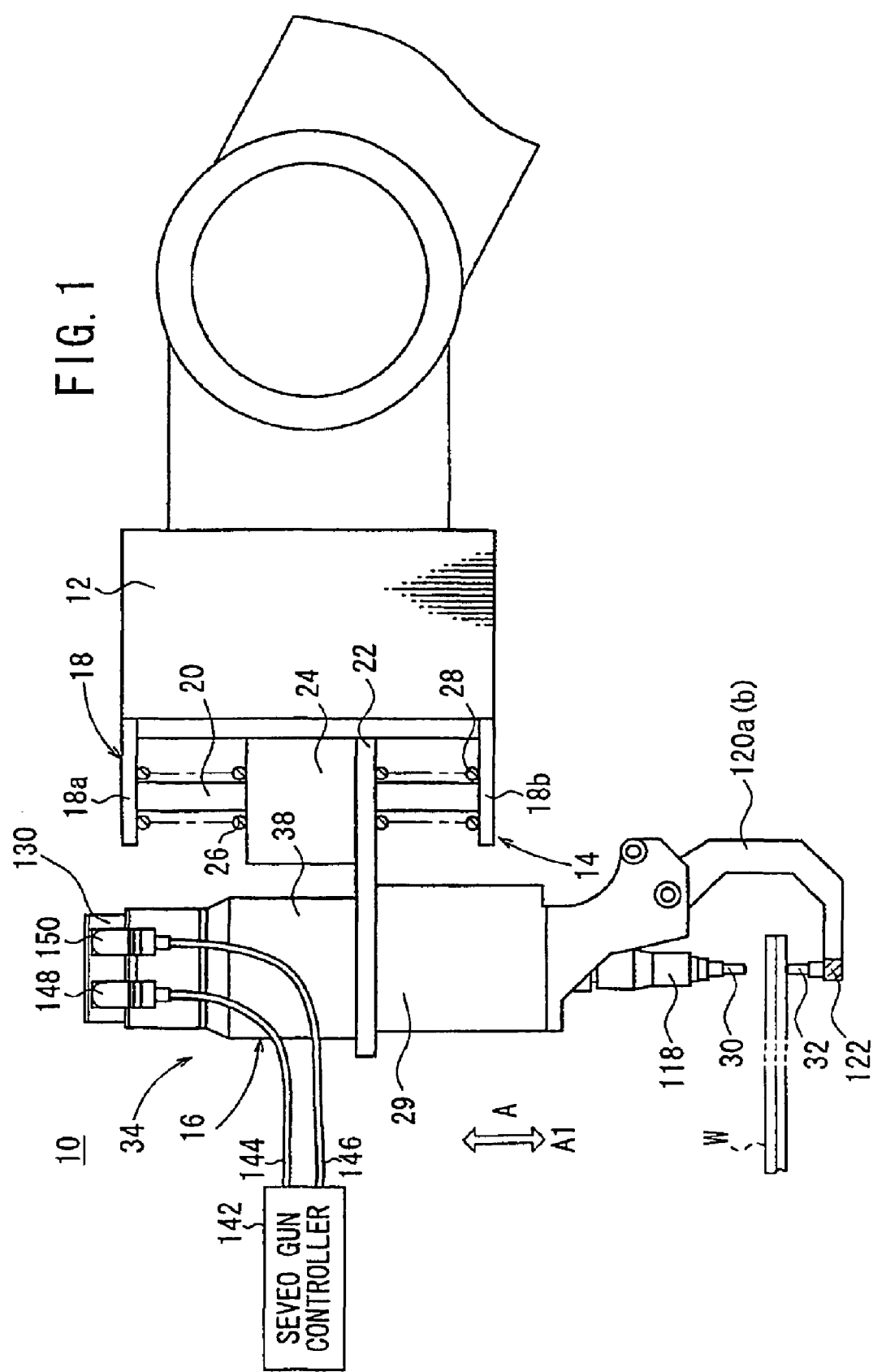
FIG. 1 is a side elevational view, partly omitted from illustration, of a motor-driven welding gun according to a first embodiment of the present invention as it is mounted on the distal end of a robot arm.

FIG. 1 shows, in side elevation, partly omitted from illustration, of a motor-driven welding gun 10 according to a first embodiment of the present invention as it is mounted on the distal end of a robot arm 12. The motor-driven welding gun 10 is arranged as a C-shaped welding gun having a movable electrode tip 30 movable linearly toward and away from a fixed electrode tip 32. However, the motor-driven welding gun 10 is not limited to such a C-shaped welding gun, but may be arranged as an X-shaped welding gun having a movable electrode tip swingable with respect to a fixed electrode tip.

The motor-driven welding gun 10 comprises a gun support 14 and a welding gun assembly 16. The gun support 14 is mounted on the distal end of the robot arm 12 and supports the welding gun assembly 16. The gun support 14 has a gun support bracket 18 including an upper panel 18a and a lower panel 18b spaced from and extending parallel to the upper panel 18a. A guide bar 20 is connected to and extends between the upper panel 18a and the lower panel 18b.

A plate 22 is fitted over the guide bar 20 for axial sliding movement therealong and extends parallel to the upper panel 18a and the lower panel 18b. A support box 24 is disposed on an upper surface of the plate 22 closer to the robot arm 12. A first coil spring 26 is disposed around the guide bar 20 between the upper panel 18a and the support box 24, and a second coil spring 28 is disposed around the guide bar 20 between the lower panel 18b and the plate 22.

Figure 2:
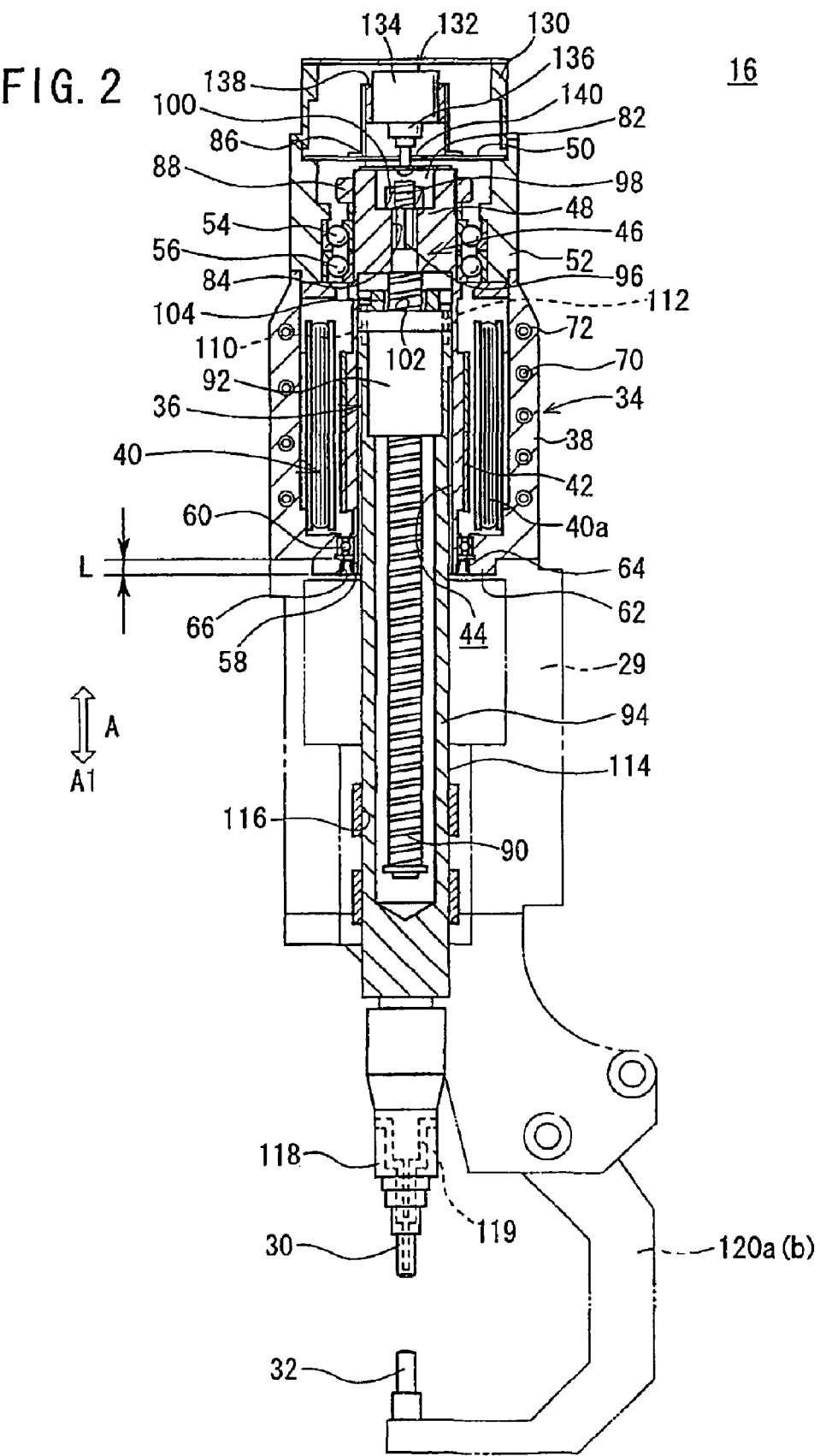
FIG. 2 is a cross-sectional view of the motor-driven welding gun.

The welding gun assembly 16 has a casing 29 fixed to a lower surface of the plate 22 remote from the robot arm 12. As shown in FIGS. 1 and 2, the welding gun assembly 16 also has a pair of electrode tips including a movable electrode tip 30 and a fixed electrode tip 32, and a feed screw mechanism 36 coupled to a servomotor 34 and rotatable thereby for moving the movable electrode tip 30 linearly toward and away from the fixed electrode tip 32.

The servomotor 34 comprises a motor housing 38 fixed to the casing 29, a stator 40 fixedly mounted in the motor housing 38, a rotor 46 rotatably disposed in the motor housing 38 and having a central hollow space 44 defined therein, and a motor housing cover 50 mounted on the motor housing 38 near an end 48 of the rotor 46.

Figure 3:
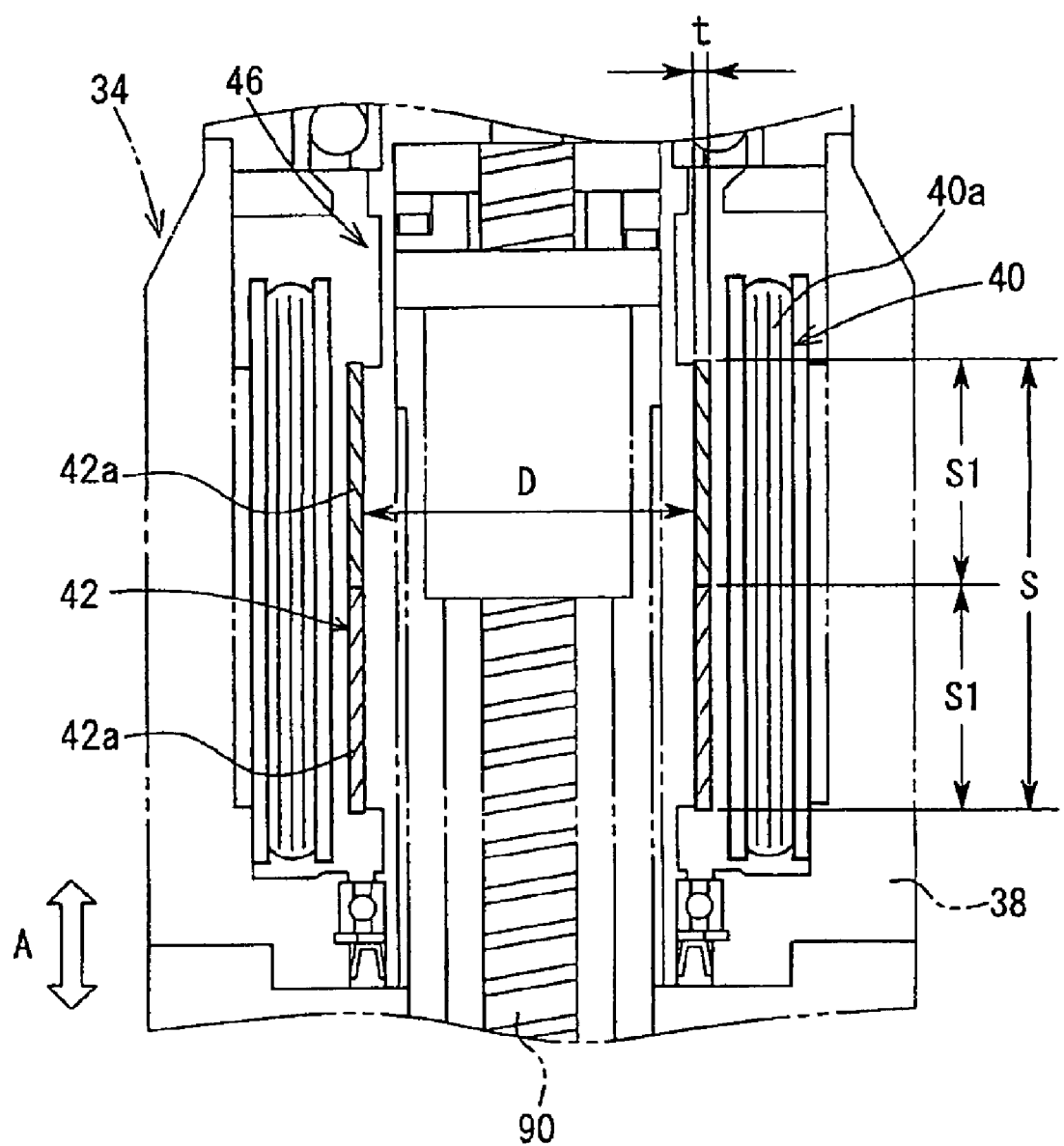
FIG. 3 is an enlarged cross-sectional view of the interior of a servomotor of the motor-driven welding gun.

As shown in FIG. 3, an annular permanent magnet 42 is fixedly mounted on an outer circumferential surface of the rotor 46. Regardless of the magnitude of the output power of the servomotor 34, the annular magnet 42 has a constant inside diameter D and a constant thickness t, and has an axial dimension S along the axis of the rotor 46 in the direction indicated by the arrow A, the axial dimension S being substantially proportional to the magnitude of the output power of the servomotor 34.

The output power of the servomotor 34 is set to a value which is twice the output power of a servomotor used for general spot welding applications (hereinafter referred to as "standard servomotor"). The axial dimension S of the magnet 42 is set to a value which is twice the axial length S1 of a magnet of the standard servomotor (hereinafter referred to as "standard magnet 42a"). According to the first embodiment, the magnet 42 comprises two standard magnets 42a arranged in an axial array. The magnet 42 may alternatively comprise a single magnet having the axial dimension S.

The stator 40 comprises a coil 40a disposed annularly within the motor housing 38, and has an axial dimension in the direction indicated by the arrow A, which is commensurate with the axial dimension S of the magnet 42 disposed in confronting relation to the coil 40a.

A tubular member 52 is coaxially fastened to an end of the motor housing 38, with the motor housing cover 50 attached to the tubular member 52. First and second bearings 54, 56 are interposed between an inner circumferential surface of the tubular member 52 and an outer circumferential surface of the end 48 of the rotor 46. A third bearing 60 is interposed between an outer circumferential surface of the other end 58 of the rotor 46 and an inner surface of the motor housing 38.

Figure 4:
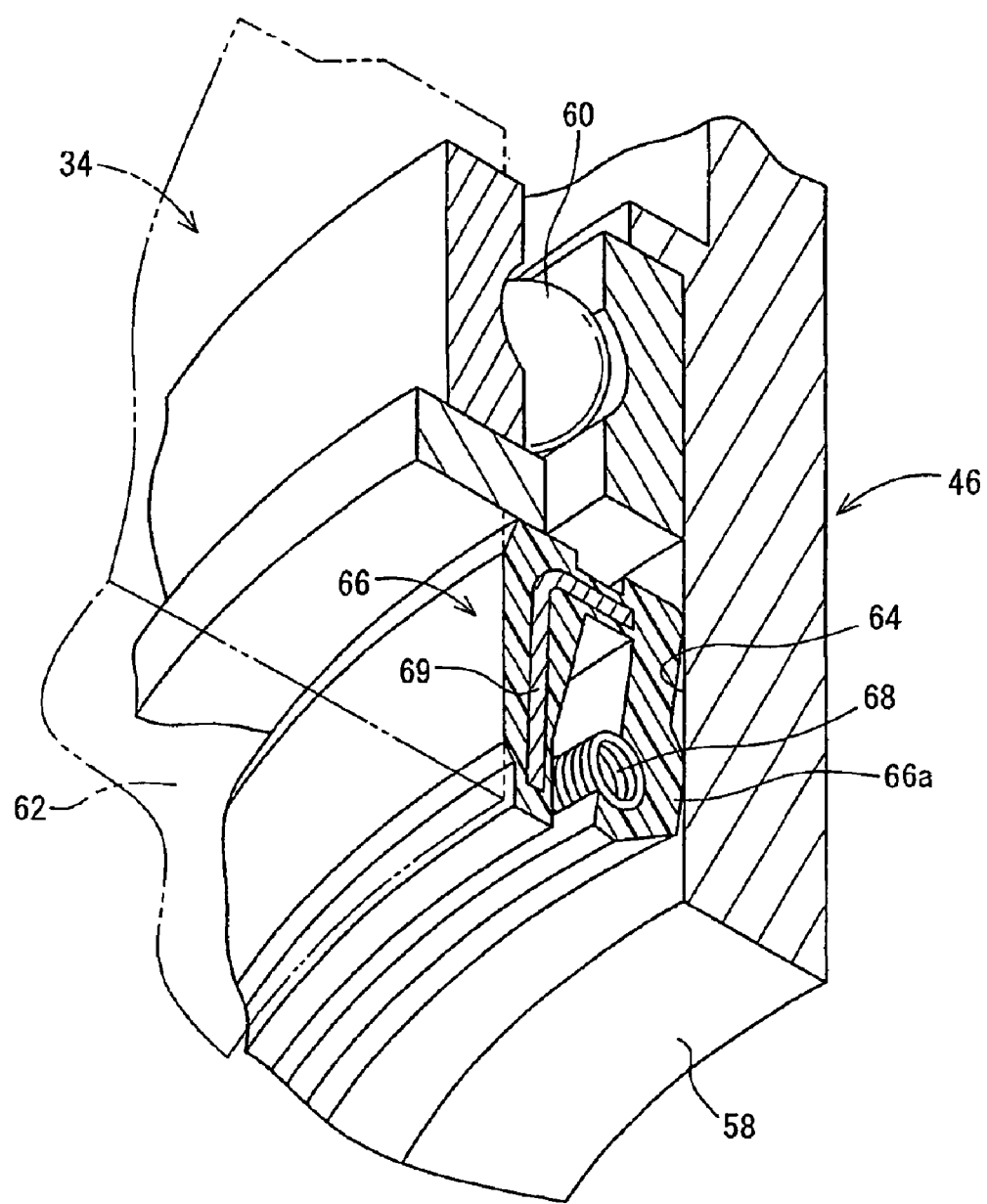
FIG. 4 is a sectional perspective view of an oil seal mechanism of the motor-driven welding gun.

The end 58 of the rotor 46 projects axially from an end face of the third bearing 60 by a distance L, and the motor housing 38 has a ring-shaped end 62 disposed around the end 58 of the rotor 46. The ring-shaped end 62, the third bearing 60, and the end 58 of the rotor 46 jointly define an annular opening 64 with an oil seal 66 press-fitted therein. As shown in FIG. 4, the oil seal 66 has a lip 66a of synthetic resin pressed against the outer circumferential surface of the end 58 of the rotor 46 by a spring 68 engaging the lip 66a. A reinforcing metal plate 69 of L-shaped cross section is embedded in the oil seal 66.

Figure 5:
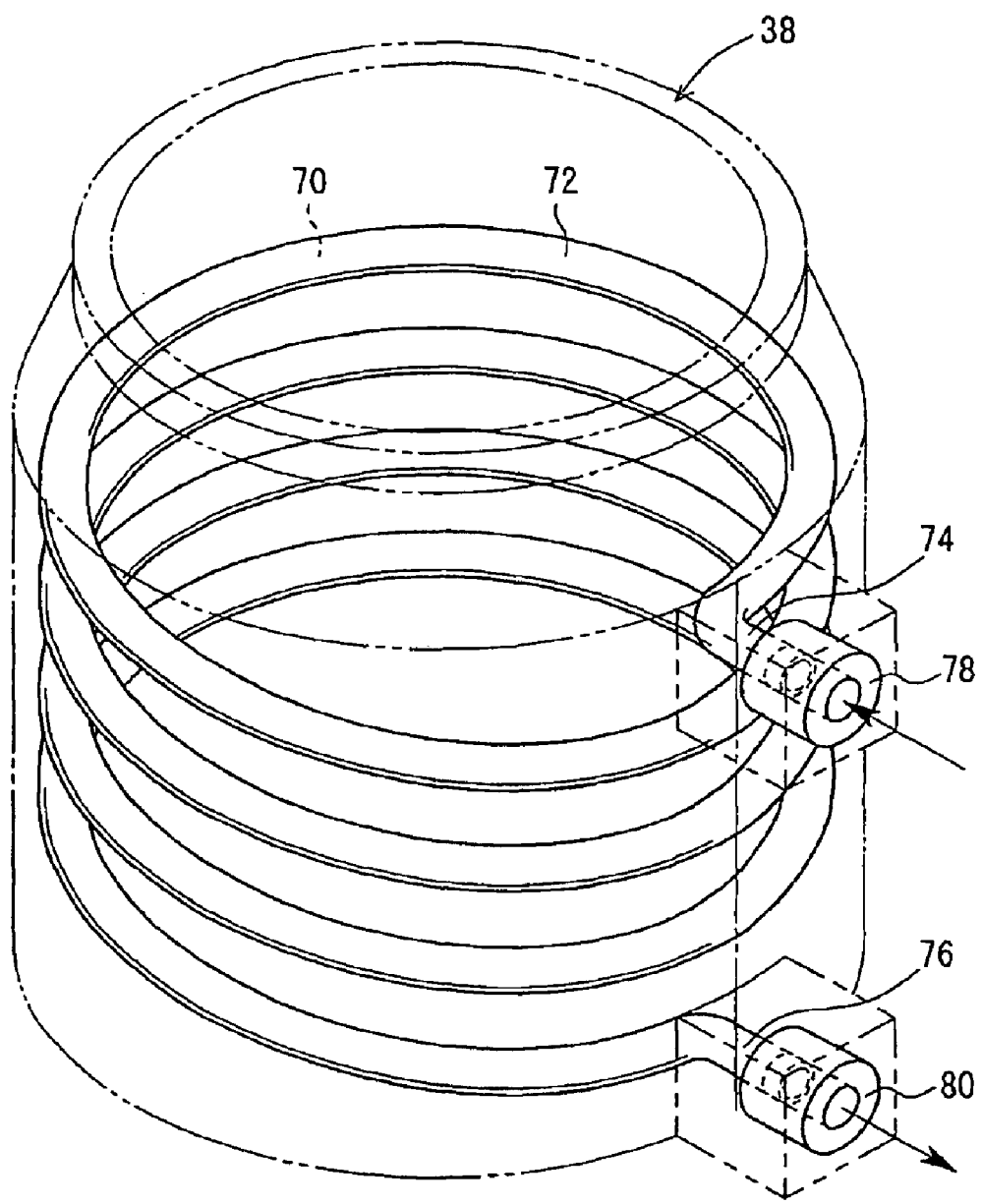
FIG. 5 is a perspective view of the interior of a motor housing of the motor-driven welding gun.

As shown in FIGS. 2 and 5, the motor housing 38 is of a substantially hollow cylindrical shape and is made of aluminum, for example. A coolant passage 70 for supplying a coolant such as cooling water or the like is defined in the motor housing 38. The coolant passage 70 is defined by a helically coiled copper pipe 72 that is inserted in the motor housing 38 when the motor housing 38 is cast.

The helically coiled copper pipe 72 has an inlet end 74 and an outlet end 76 which support respective tubular holders 78, 80 of copper thereon that are fixed, as by brazing, to the inlet and output ends 74, 76, respectively, before the motor housing 38 is cast with the helically coiled copper pipe 72 inserted therein. The holders 78, 80 have a predetermined wall thickness, and are inserted in the motor housing 38 as it is cast in covering relation to the inlet and output ends 74, 76, respectively.

As shown in FIG. 2, the end 48 of the rotor 46 has an opening 82 defined as a recess in its upper end portion, and a splined hole 84 defined centrally axially therein and communicating with an inner end of the opening 82. A thin plate 86 is fixed to the upper surface of the end 48, closing the opening 82. A fastening nut 88 is threaded over an upper portion of the end 48 of the rotor 46 to preload the first bearing 54 to prevent the rotor 46 from being axially displaced.

Figure 6:
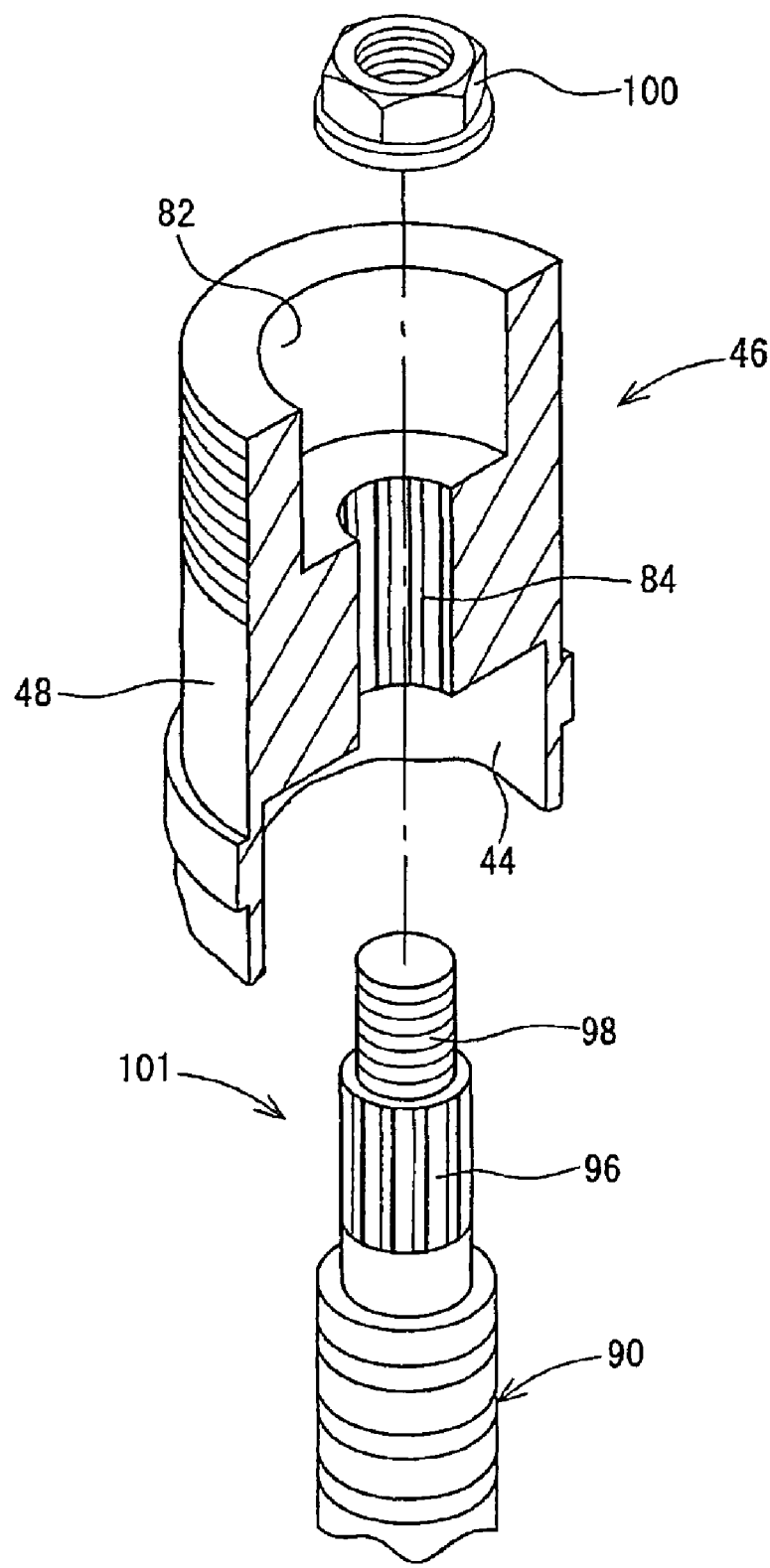
FIG. 6 is an exploded sectional perspective view of a fastening structure of the motor-driven welding gun.

The feed screw mechanism 36 comprises a feed screw 90 having an end mounted on the end 48 of the rotor 46, a nut 92 threaded over the feed screw 90, and a hollow rod 94 fixed to the nut 92 and enclosing the feed screw 90. As shown in FIG. 6, the feed screw 90 comprises a splined shaft 96 fitted in the splined hole 84 defined in the end 48 of the rotor 46, and a screw 98 disposed on the end of the splined shaft 96. The feed screw 90 is fixed to the rotor 46 by a nut 100 threaded over the screw 98. The splined hole 84 and the splined shaft 96 jointly make up a fastening structure 101 which integrally joins the rotor 46 and the feed screw 90 to each other.

Figure 7:
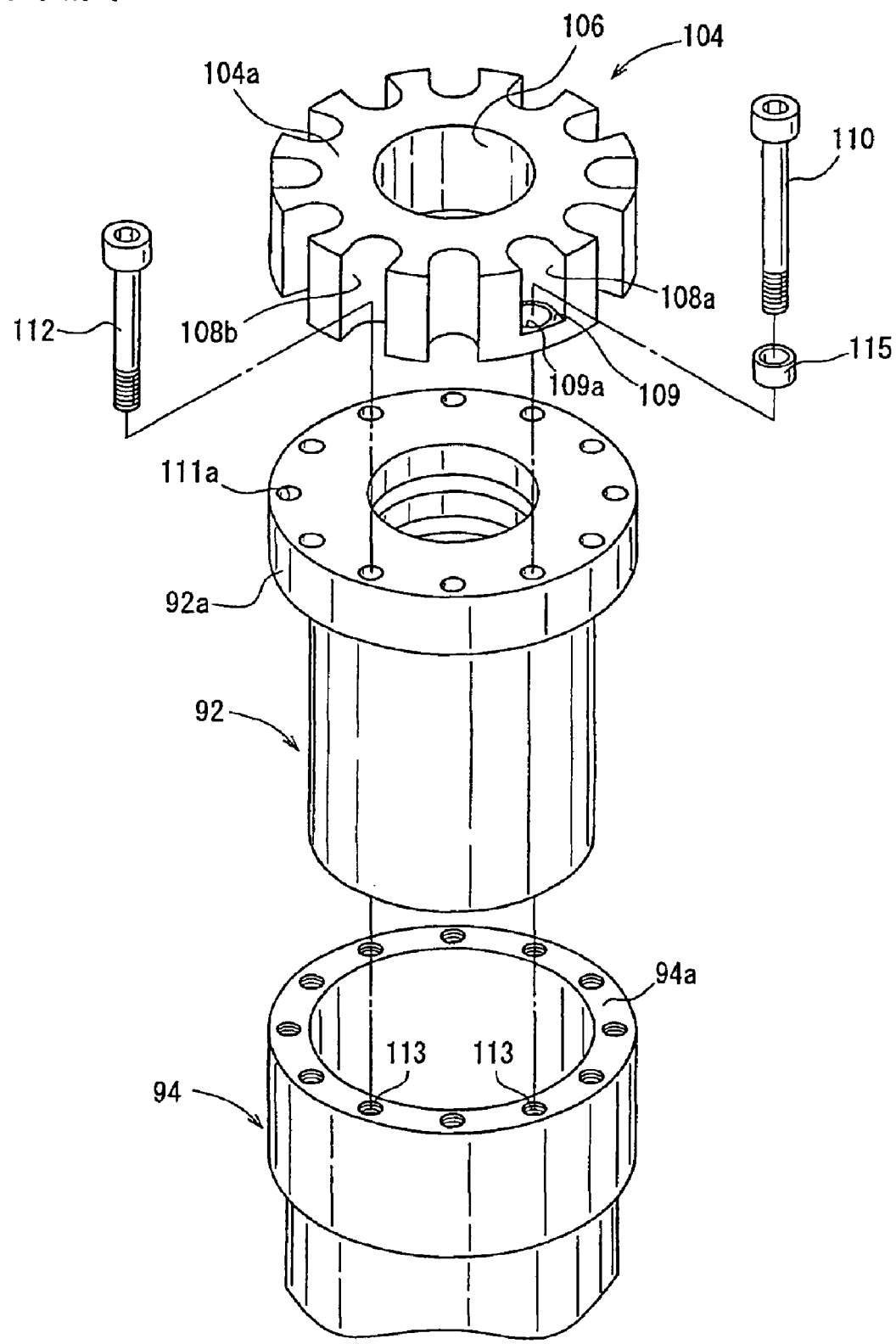
FIG. 7 is an exploded perspective view of a hollow rod, a nut, and a damping member of the motor-driven welding gun.
Figure 8:
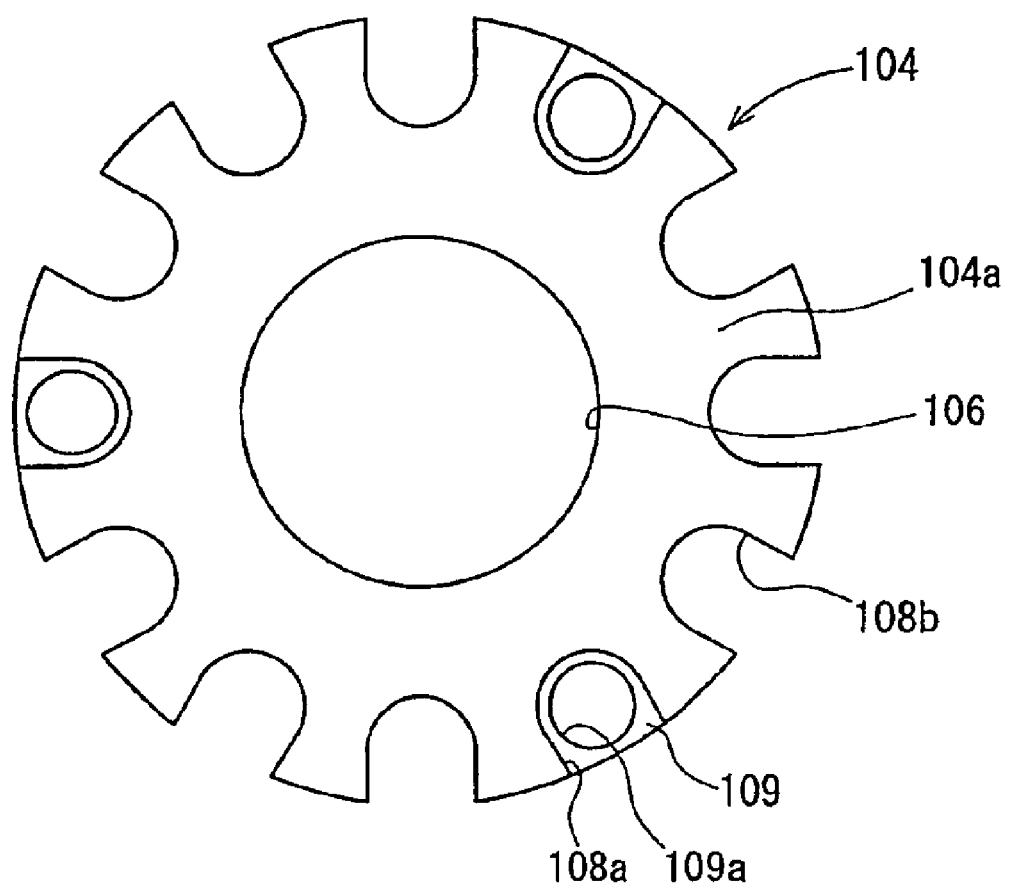
FIG. 8 is a front elevational view of the damping member.

As shown in FIG. 2, a damping member 104 is fixed to an end face 102 of the nut 92 which faces the end 48 of the rotor 46. As shown in FIGS. 7 and 8, the damping member 104 is of a substantially hollow cylindrical shape, and is made of a resilient material such as urethane resin or the like.

The damping member 104 has a hole 106 defined centrally therein through which the feed screw 90 extends. The damping member 104 also has a plurality of (e.g., three) first recesses 108a defined in an outer circumferential edge thereof at equal angularly spaced intervals. The first recesses 108a extend axially from a contact surface 104a of the damping member 104 to a certain depth, and have respective bottoms 109 having respective holes 109a defined therein.

Between the first recesses 108a, there are defined a plurality of second recesses 108b, three between each pair of the first recesses 108a, in the outer circumferential edge of the damping member 104. The second recesses 108b extend axially from the contact surface 104a of the damping member 104 all the way to the opposite surface thereof. The contact surface 104a of the damping member 104 serves to contact the end 48 of the rotor 46, and extends between the first and second recesses 108a, 108b to the outer circumferential edge of the damping member 104.

The damping member 104, the nut 92, and the hollow rod 94 are fastened together by first screws 110 having respective heads disposed in the first recesses 108a and extending through the holes 109a, and the nut 92 and the hollow rod 94 are fastened together by second screws 112 having respective heads disposed in the second recesses 108b. As shown in FIG. 7, the nut 92 has a large-diameter flange 92a on its upper end which has a plurality of holes 111a defined therein at equal angularly spaced intervals for the passage of the first and second screws 110, 112 therethrough. The rod 94 has an end face 94a which has a plurality of threaded holes 113 defined therein at equal angularly spaced intervals in axial alignment with the respective holes 111a. The first and second screws 110, 112 are threaded respectively into the threaded holes 113. Metal collars 115 are inserted in the respective holes 109a in the damping member 104 to prevent the damping member 104 from collapsing when it is fastened to the nut 92 and the hollow rod 94 by the first screws 110.

As shown in FIG. 2, the hollow rod 94 is elongate in the direction indicated by the arrow A, and extends axially through the hollow space 44 in the rotor 46. The hollow rod 94 has a splined outer circumferential surface 114 threaded in a splined hole 116 defined in the casing 29 for thereby preventing the hollow rod 94 and the nut 92 from rotating. The movable electrode tip 30 is removably mounted on the distal end of the hollow rod 94 by a holder 118. A coolant passage 119 for supplying a coolant such as cooling water is defined in the holder 118 and the movable electrode tip 30.

As shown in FIG. 1, a pair of C-shaped yokes 120a, 120b is fixed to and extends downwardly from the casing 29, and the fixed electrode tip 32 is removably held by a holder 122 which is attached to and disposed between the yokes 120a, 120b.

A head cover 130 is mounted on the tubular member 52 above the motor housing cover 50 (see FIG. 2). The head cover 130 houses therein an encoder 132 for detecting a rotational angle of the rotor 46. The encoder 132 comprises an encoder unit 134 and an input shaft 136 projecting downwardly from the encoder unit 134. The encoder unit 134 is held by a cylindrical stay 138 fixedly mounted on the motor housing cover 50. The input shaft 136 extends through a hole 140 defined substantially centrally in the motor housing cover 50 and is connected to the thin plate 86.

As shown in FIG. 1, first and second power supply connectors 148, 150 which are substantially L-shaped are mounted on a side panel of the head cover 130. The first and second power supply connectors 148, 150 are connected to power lines 144, 146, respectively, extending from a servo gun controller 142, which serves as a drive unit for operating the servomotor 34 and the encoder 132.

Operation of the motor-driven welding gun 10 thus constructed will be described below.

When the servo gun controller 142 supplies electric power to the servomotor 34, the coil 40a is energized to generate a magnetic field in coaction with the stator 40 and the annular permanent magnet 42 which confronts the stator 40. The rotor 46 of the servomotor 34 now rotates under the magnetic field.

When the rotor 46 rotates, the feed screw 90 of the feed screw mechanism 36 is rotated, moving the nut 92 threaded over the feed screw 90 in unison with the hollow rod 94 in an axial direction of the feed screw 90, e.g., in the direction indicated by the arrow A1. This is because the splined outer circumferential surface 114 of the hollow rod 94 is threaded in the splined hole 116 defined in the casing 29, preventing the hollow rod 94 and the nut 92 from rotating.

The movable electrode tip 30 held by the holder 118 fixed to the distal end of the hollow rod 94 is moved in the direction indicated by the arrow A1, holding workpieces W under pressure between the fixed electrode tip 32 and the movable electrode tip 30. Then, a large current is supplied between the movable electrode tip 30 and the fixed electrode tip 32, spot-welding the workpieces W.

In the first embodiment, the stator 40 and the permanent magnet 42 of the servomotor 34 are elongate axially in the direction indicated by the arrow A, allowing the servomotor 34 to produce a high torque. Therefore, the servomotor 34 tends to produce a considerably large amount of heat.

According to the first embodiment, the passage 70 defined by the helically coiled copper pipe 72 cast in the motor housing 38 of the servomotor 34 is supplied with a coolant such as cooling water. Since the servomotor 34 is forcibly cooled by the coolant flowing through the helical passage 70 in the motor housing 38, the amount of heat generated by the servomotor 34 is not increased if the motor-driven welding gun 10 is arranged to produce a high torque.

As the passage 70 is integrally provided in the servomotor 34, the servomotor 34 is reduced in weight and size. Any add-on cooling structure does not need to be mounted on the servomotor 34, so that the cost of the facility of the motor-driven welding gun 10 can be greatly reduced. As the facility of the motor-driven welding gun 10 is reduced and the size of the motor-driven welding gun 10 is also reduced, the freedom in the working space provided around the motor-driven welding gun 10 is effectively increased.

The amount of heat generated by the servomotor 34 is also effectively suppressed when the usage ratio of the motor-driven welding gun 10 is increased for increased productivity. The productivity in relation to operation of the motor-driven welding gun 10 can thus be increased, making it possible to greatly reduce the manufacturing cost of products (welded workpieces).

According to the first embodiment, the pipe 72 is inserted in the motor housing 38 when the motor housing 38 is cast, thus providing the passage 70 in the motor housing 38. Consequently, the servomotor 34 can be cooled with increased efficiency, and can be manufactured economically without a substantial increase in the manufacturing cost.

The holders 78, 80 of copper are fixed, as by brazing, to the inlet and output ends 74, 76, respectively, of the helically coiled pipe 70 of copper, and the motor housing 38 is cast with the holders 79, 80 inserted therein. Thus, the inlet and output ends 74, 76 of the pipe 70 of copper are held out of direct contact with the motor housing 38 of aluminum, reliably preventing themselves from suffering electrolytic corrosion.

In the first embodiment, the annular permanent magnet 42 is fixed to the rotor 46. Regardless of the magnitude of the output power of the servomotor 34, the annular magnet 42 has a constant inside diameter D and a constant thickness t, and has an axial dimension S along the axis of the rotor 46 in the direction indicated by the arrow A, the axial dimension S being substantially proportional to the magnitude of the output power of the servomotor 34.

Specifically, the output power of the servomotor 34 is set to a value which is twice the output power of a standard servomotor, and the axial dimension S of the magnet 42 is set to a value which is twice the axial length S1 of the magnet of the standard servomotor. Since the radial dimension of the servomotor 34 is not increased even though the servomotor 34 produces the high torque, centrifugal forces produced when the servomotor 34 is energized remain substantially the same as the centrifugal forces produced by the standard servomotor.

Thus, the servomotor 34 can be rotated at a higher speed for an increased output power, allowing the movable electrode tip 30 to move toward and away from the fixed electrode tip 32 at a higher speed. Therefore, the cycle time of spot-welding operation of the motor-driven welding gun 10 can effectively be reduced, increasing its productivity with a simple arrangement.

According to the first embodiment, the magnet 42 comprises two standard magnets 42a arranged in an axial array. If various servomotors 34 capable of producing different output powers are to be used, then they are not required to have their own unitary magnets 42 of different lengths or axial dimensions, but may share standard magnets 42a. Therefore, those different servomotors 34 can be constructed highly economically.

Furthermore, as shown in FIGS. 2 and 6, the fastening structure 101 for integrally coupling the rotor 46 and the feed screw 90 is disposed between the end 48 of the rotor 46 and the feed screw 90. The fastening structure 101 is made up of the splined hole 84 defined in the end 48 of the rotor 46 and the splined shaft 96 on the end of the feed screw 90, the splined shaft 96 being fitted in the splined hole 84.

Consequently, the rotor 46 and the feed screw 90 can firmly be fastened to each other. Even if the servomotor 34 is designed for a higher torque, the rotor 46 and the feed screw 90 are prevented from slipping against each other by the splined hole 84 and the splined shaft 96. The number of parts that make up the fastening structure 101 is smaller than the number of parts that make up the conventional power lock mechanism, allowing the motor-driven welding gun 10 to be simplified and compact in structure and also to be manufactured economically. The servomotor 34 can thus easily be designed and manufactured for a higher torque and in a small size.

Since the fastening structure 101 has the splined hole 84 and the splined shaft 96, it is highly simple, and allows the rotor 46 and the feed screw 90 to be reduced in their radial dimensions. Therefore, the servomotor 34 is prevented from increasing in its radial size, but is compact in structure and can easily be arranged to produce a higher torque.

Figure 9:
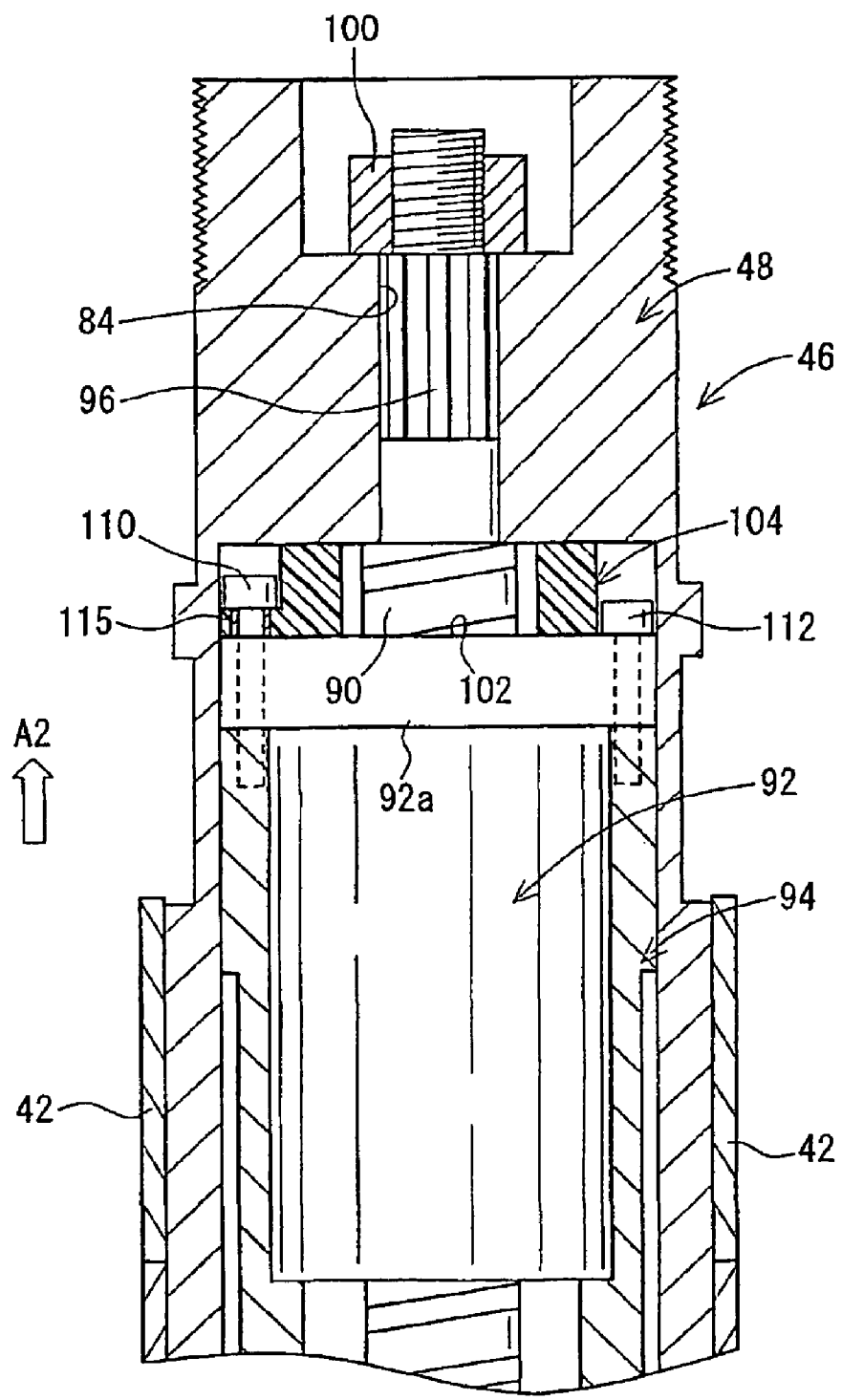
FIG. 9 is a cross-sectional view showing the manner in which the damping member operates.

After the workpieces W have been spot-welded by the fixed electrode tip 32 and the movable electrode tip 30, the servomotor 34 is reversed to rotate the rotor 46 and the feed screw 90 in the opposite direction. The nut 92 threaded over the feed screw 90 is therefore moved axially in the opposite direction indicated by the arrow A2 (see FIG. 9), displacing the movable electrode tip 30 away from the fixed electrode tip 32. At this time, according to the conventional motor-driven welding gun, the nut 92 may move beyond a given retracted position toward the end 48 of the rotor 46 and may impinge upon the end 48 of the rotor 46 due to a control failure of the servomotor 34.

According to the first embodiment, the damping member 104 which is made of a resilient material such as urethane resin, for example, is fixed to the end face 102 of the nut 94. Therefore, the nut 92 is prevented from directly impinging upon the end 48 of the rotor 46, but the damping member 104 fixed to the nut 92 abuts against the end 48 of the rotor 46.

Shocks produced between the nut 92 and the end 48 are absorbed by the damping member 104, and hence impact loads are prevented from being applied to the joint between the feed screw 90 and the rotor 46, i.e., to the splined shaft 96 and the splined hole 84. It is thus possible, reliably with a simple arrangement, to prevent slippage in the threaded joint between the splined shaft 96 and the splined hole 84 and to prevent damage to the splined shaft 96 and the splined hole 84.

The contact surface 104 of the damping member 104 which contacts the end 48 of the rotor 46 extends between the first and second recesses 108a, 108b to the outer circumferential edge of the damping member 104. Therefore, the area of contact of the contact surface 104a is large enough to prevent the damping member 104 from being deformed more than necessary and to allow the damping member 104 to keep its desired damping capability.

The first recesses 108a extend axially to a certain depth in the damping member 104, and the first screws 110 with the collars 115 disposed therearound are inserted in the holes 109a defined in the bottoms of the first recesses 108a. The first screws 110 firmly secure the damping member 104 to the nut 92 and the hollow rod 94. Since some of the bolts (first and second screws 110, 112) used to fasten the hollow rod 94 to the nut 92 serve as the bolts (first screws 110) used to fasten the damping member 104 to the nut 92, the overall structure is relatively simplified.

When the workpieces W are spot-welded, the movable electrode tip 30 and the fixed electrode tip 32 are damaged and are occasionally need to be replaced with new ones. When the movable electrode tip 30 is removed from the holder 118, the coolant tends to leak from the coolant passage 119 which is defined in the movable electrode tip 30 and the holder 118.

According to the first embodiment, the oil seal 66 (see FIG. 4) is press-fitted in the opening 64 that is defined jointly by the ring-shaped end 62 of the motor housing 38, the third bearing 60, and the end 58 of the rotor 46, and that faces the electrode tips 30, 32. Even when the coolant leaks from the coolant passage 119, therefore, the coolant is reliably prevented from entering through the opening 64 into the motor housing 38.

In as much as problems including an insulation failure, an electric short circuit, or a rust-caused contact failure, which might otherwise occur if the coolant entered the coil 40a or the encoder 132, are not caused, the servomotor 34 can achieve its desired performance. The oil seal 66 only can thus provide a highly accurate sealing capability, is highly simple in structure, and allows the motor-driven welding gun 10 to economically perform high-quality, efficient welding operation.

In the first embodiment, the oil seal 66 is used in the opening 64. However, any of various other seals such as a gasket, an O-ring, etc. rather than the oil seal 66 may be used in the opening 64.

Figure 10:
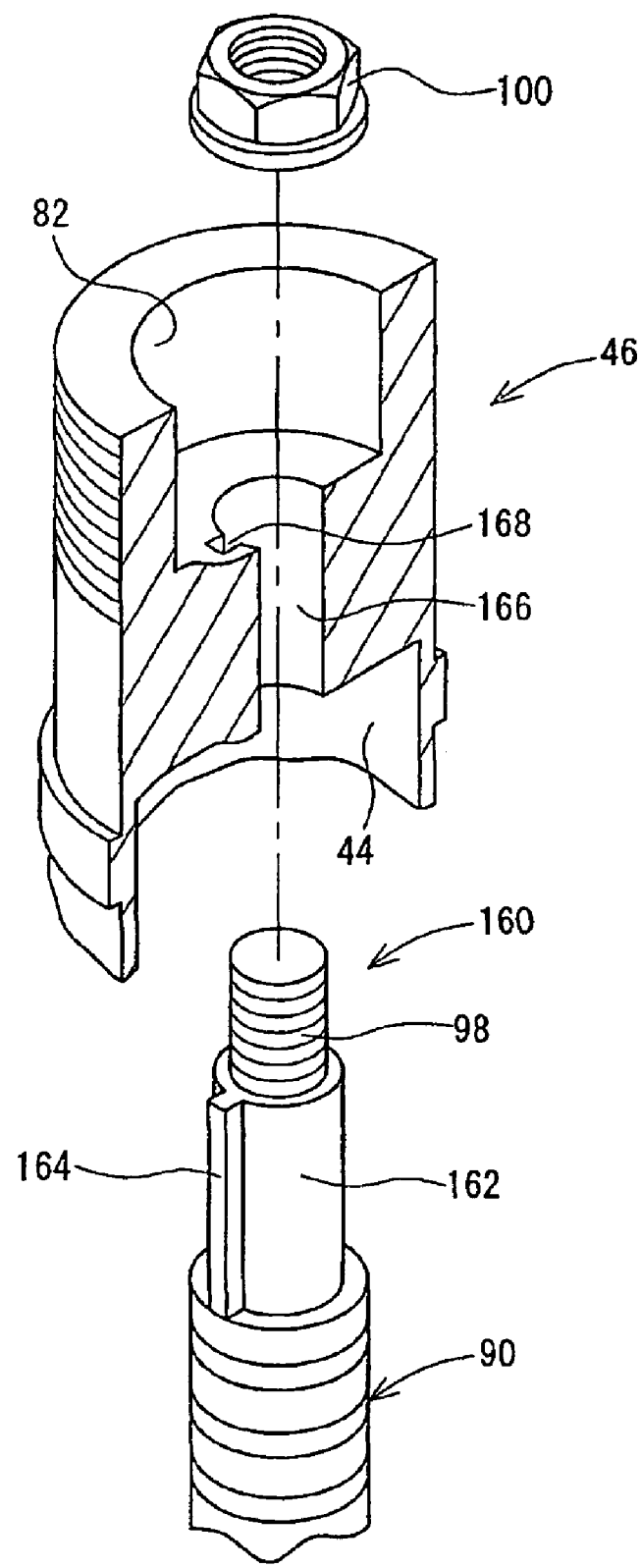
FIG. 10 is an exploded sectional perspective view of a fastening structure of a motor-driven welding gun according to a second embodiment of the present invention.

FIG. 10 shows, in exploded sectional perspective, a fastening structure 160 of a motor-driven welding gun according to a second embodiment of the present invention. Those parts of the fastening structure 160 which are identical to those of the motor-driven welding gun 10 according to the first embodiment are denoted by identical reference characters, and will not be described in detail below. The parts of motor-driven welding guns according to other embodiments, described later on, which are identical to those of the motor-driven welding gun 10 according to the first embodiment are also denoted by identical reference characters, and will not be described in detail below.

As shown in FIG. 10, a feed screw 90 has a shaft 162 integrally therewith which has an axially extending ridge 164 disposed on an outer circumferential surface thereof. A rotor 46 has a hole 166 defined therein for the passage of the shaft 162 therethrough. The rotor 46 also has a groove 168 defined therein which communicates with the hole 166 in alignment with the ridge 164.

In the second embodiment, the shaft 162 of the feed screw 90 is fitted in the hole 166 in the rotor 46, and the ridge 164, which serves as the fastening structure 160, is fitted in the groove 168. Therefore, the feed screw 90 and the rotor 46 are firmly fastened to each other and do not slip against each other even when the rotor 46 is rotated under a high torque. Therefore, as with the first embodiment, the servomotor is of a simple and compact structure, is capable of easily producing a higher torque, and can easily be reduced in size.

While the shaft 162 is shown as having the single ridge 164 in the second embodiment, the shaft 162 may have a plurality of ridges 164 and the rotor 46 may have a plurality of grooves 168 which receive the ridges 164. respectively.

Figure 11:
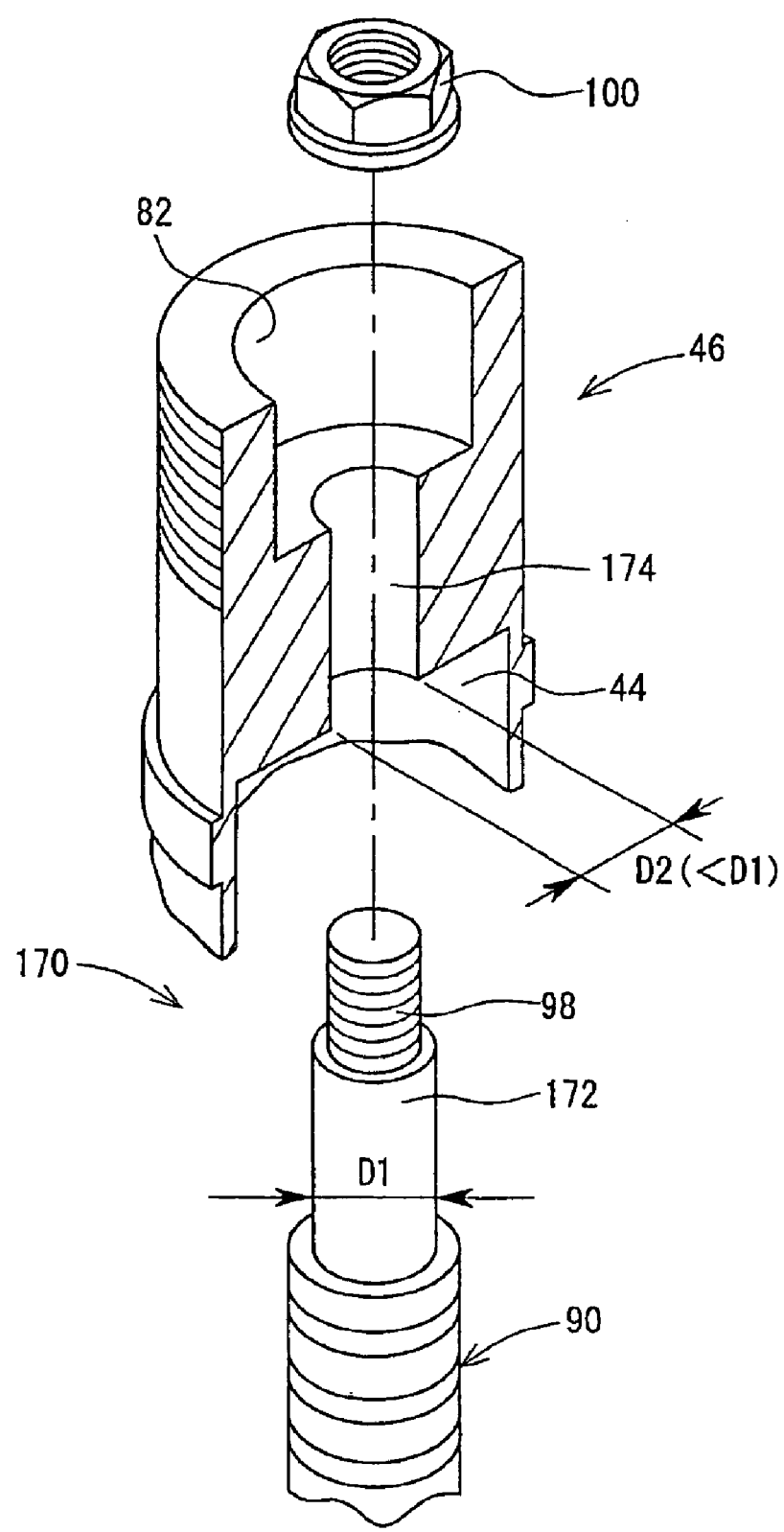
FIG. 11 is an exploded sectional perspective view of a press-fitting structure of a motor-driven welding gun according to a third embodiment of the present invention.

FIG. 11 shows, in exploded sectional perspective, a press-fitting structure 170 of a motor-driven welding gun according to a third embodiment of the present invention. As shown in FIG. 11, the press-fitting structure 170 has a shaft 172 mounted on a feed screw 90 and a hole 174 defined in a rotor 46. The shaft 172 has a diameter D1 greater than the diameter D2 of the hole 174 (D1>D2).

The shaft 172 of the feed screw 90 is press-fitted into the hole 174 in the rotor 46, thus firming fastening the rotor 46 to the feed screw 90. Therefore, as with the first and second embodiments, the servomotor is of a simple and compact structure, is capable of easily producing a higher torque, and can easily be reduced in size.

Figure 12:
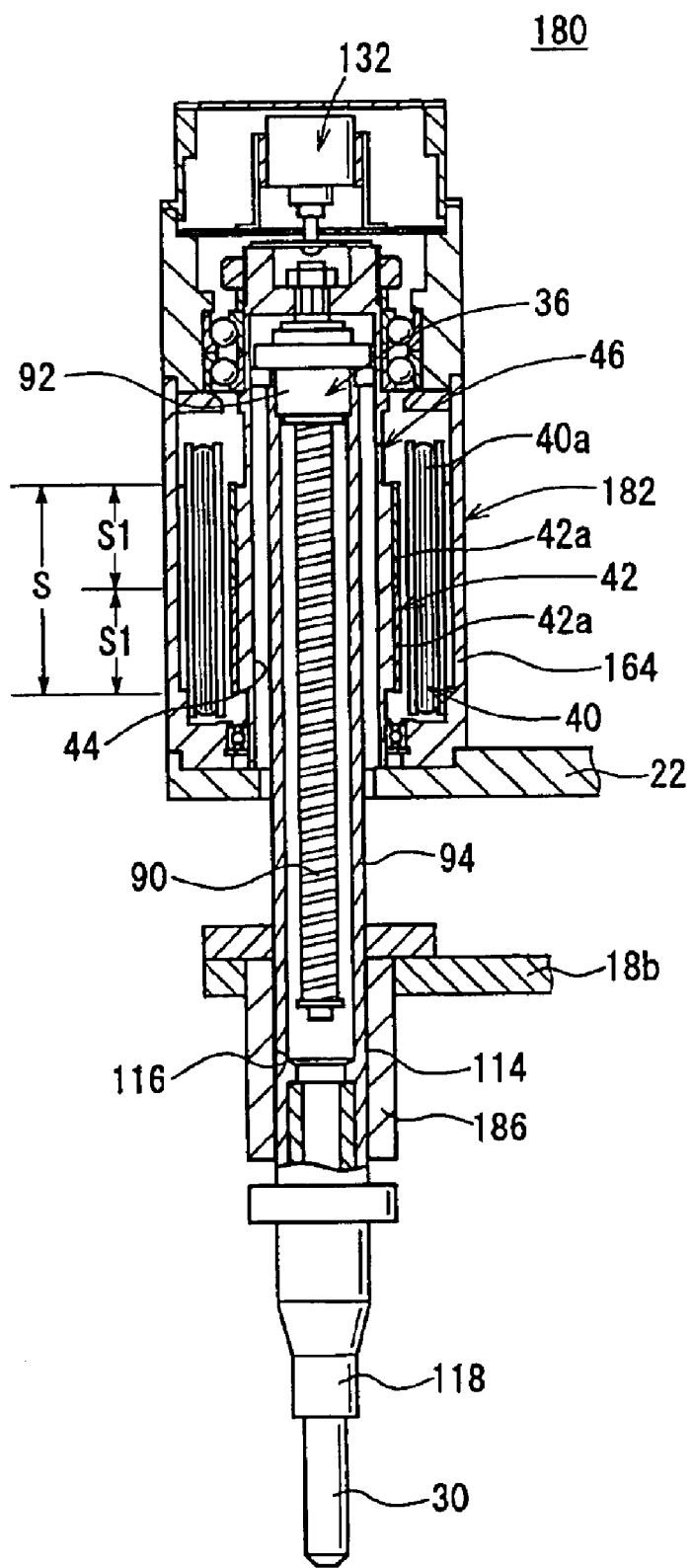
FIG. 12 is a cross-sectional view of a motor-driven welding gun according to a fourth embodiment of the present invention.

FIG. 12 shows, in cross section, a motor-driven welding gun 180 according to a fourth embodiment of the present invention.

As shown in FIG. 12, the motor-driven welding gun 180 has a servomotor 182 which comprises a motor housing 184 fixed to a plate 22, a stator 40 fixedly mounted in the motor housing 184, and a rotor 46 rotatably disposed in the motor housing 184 and having a central hollow space 44 defined therein. No pipe 72 is inserted in the motor housing 184.

A gun barrel 186 is fixed to a lower panel 18b, and a splined surface 114 of a hollow rod 94 is threaded in a splined hole 116 defined in the gun barrel 186.

The motor-driven welding gun 180 thus constructed according to the fourth embodiment offers the same advantages as those of the motor-driven welding guns according to the first through third embodiments.

The motor-driven welding gun 180 according to the fourth embodiment is shown as incorporating the fastening structure 101. However, the motor-driven welding gun 180 may incorporate the fastening structure 160 or the press-fitting structure 170.

In the first and fourth embodiments, the axial dimension S of the magnet 42 is set to a value which is twice the axial length S1 of the standard magnet 42a. However, the axial dimension S may be set to a value which is three times the axial length S1, and the magnet 42 may be made up of three standard magnets 42a arranged in an axial array.

Industrial Applicability

With the motor-driven welding gun according to the present invention, the motor housing of the servomotor has the coolant passage supplied with the coolant for effectively cooling the servomotor. The motor-driven welding gun can thus produce a higher torque and can be used at a higher ratio. The servomotor thus cooled does not produce an increased amount of heat, can be reduced in size and weight, and does not require any add-on cooling structure, resulting in a reduction in the cost of the facility of the motor-driven welding gun. The entire facility of the motor-driven welding gun takes up a reduced space, and can perform high-quality welding operation economically.

Furthermore, the magnet fixed to the hollow rotor of the servomotor has a constant inside diameter and a constant thickness regardless of the magnitude of the output power of the servomotor, and the axial dimension of the magnet along the axis of the hollow rotor is substantially proportional to the magnitude of the output power of the servomotor. Therefore, if the servomotor is designed for a higher torque, the radial dimension of the servomotor is not increased, and centrifugal forces produced when the servomotor rotates are effectively prevented from increasing. Therefore, the servomotor can be rotated at a higher speed for an increased output power, allowing the movable electrode tip to move toward and away from the fixed electrode tip at a higher speed. Thus, the cycle time of spot-welding operation of the motor-driven welding gun can effectively be reduced.

In addition, the hollow rotor of the servomotor and the feed screw of the feed screw mechanism are firmly joined to each other by the interfitting fastening structure. There is no slippage occurring between the hollow rotor and the feed screw, and the servomotor can easily be designed and manufactured for a higher torque and in a smaller size with a simple and compact arrangement. The motor-driven welding gun is made up of a relatively small number of parts, and can be manufactured without involving an increase in the cost.

Moreover, the seal member is interposed between the motor housing of the servomotor and the hollow rotor rotatably housed in the motor housing, and disposed on the open end that faces the electrode tips. The seal member is effective to prevent water from entering into the motor housing through the region between the motor housing and the hollow rotor. The servomotor is thus capable of achieving desired performance with a simple arrangement.

Furthermore, the damping member is disposed in the region of contact between the hollow rotor of the servomotor and the nut of the feed screw mechanism. When the nut is moved toward the hollow rotor in order to displace one of the electrode tips away from the other electrode tip, the damping member absorbs shocks applied between the nut and the hollow rotor, thus preventing an impact load from being applied to the joint between the feed screw and the hollow rotor. It is thus possible to reliably prevent, with a simple arrangement, the joint between the feed screw and the hollow rotor from slipping and being damaged.

Although certain preferred embodiments of the present invention have been shown and described in detail, it should be understood that various changes and modifications may be made therein without departing from the scope of the appended claims.

What is claimed is:

1. A motor-driven welding gun comprising:
   a pair of electrode tips;
   a servomotor; and
   a feed screw mechanism coupled to said servomotor and rotatable thereby for moving one of said electrode tips toward and away from the other electrode tip;
   said servomotor having a motor housing having a coolant passage defined therein for supplying a coolant therethrough, said coolant passage being defined by a pipe of copper which is inserted in said motor housing when the motor housing is cast;
   said pipe being of a helically coiled structure, comprising tubular holders of copper connected to respective inlet and outlet ends of said pipe and inserted in said motor housing when the motor housing is cast.

2. A motor-driven welding gun comprising:
   a welding gun assembly including a pair of electrode tips, a servomotor, and a feed screw mechanism coupled to said servomotor and rotatable thereby for moving one of said electrode tips toward and away from the other electrode tip;
   said servomotor comprising:
      a motor housing mounted on said welding gun assembly;
      a stator fixedly mounted in said motor housing;
      a hollow rotor rotatably housed in said motor j housing, and
      a plurality of magnets fixed to said hollow rotor;
   each of said magnets having a constant radial dimension and a constant thickness;
   said magnets being arranged along an axis of said hollow rotor depending on the output poorer of said servomotor, so that the whole of said magnets has an axial dimension, which is substantially proportional to the magnitude of the output power of said servomotor;
   said stator including a coil having an axial dimension which is commensurate with the axial dimension of said magnet which is disposed in confronting relation to said coil.

3. A motor-driven welding gun comprising:
   a welding gun assembly including a pair of electrode tips, a servomotor, and a feed screw mechanism coupled to said servomotor and rotatable thereby for moving one of said electrode tips toward and away from the other electrode tip;
   said servomotor comprising:
      a motor housing mounted on said welding gun assembly;
      a stator fixedly mounted in said motor housing; and
      a hollow rotor rotatably housed in said motor I housing;
   said feed screw mechanism comprising:
      a feed screw coupled to and rotatable with said hollow rotor; and
      a nut threaded over said feed screw for moving said one of said electrode tips toward and away from the other electrode tip in response to rotation of said feed screw;
   said hollow rotor and said feed screw being joined to each other by an interfitting fastening structure or by a press-fitting structure, said interfitting fastening structure comprising splined members.

4. A motor-driven welding gun comprising:
   a welding gun assembly including a pair of electrode tips, a servomotor, and a feed screw mechanism coupled to said servomotor and rotatable thereby for moving one of said electrode tips toward and away from the other electrode tip;
   said servomotor comprising:
      a motor housing mounted on said welding gun assembly;
      a stator fixedly mounted in said motor housing; and
      a hollow rotor rotatably housed in said motor housing; and
   a seal member interposed between said motor housing and said hollow rotor and disposed on an open end that faces said electrode tips.

5. A motor-driven welding gun according to claim 4, wherein said seal member comprises:
   a bearing by which said hollow rotor is rotatable supported in said motor housing; and
   an oil seal disposed in an opening defined between an outer circumferential surface of said hollow rotor and an inner circumferential surface of said motor housing,
   wherein said damping member is of a substantially hollow cylindrical shape, said damping member having recesses which receive respective heads of screws fastening said damping member to said nut and respective heads of screws fastening a hollow rod which holds said one of said electrode tips to said nut, said damping member having a contact surface contacting said hollow rotor and extending between said recesses to an outer circumferential edge of said damping member.

6. A motor-driven welding gun comprising:
   a welding gun assembly including a pair of electrode tips, a servomotor, and a feed screw mechanism coupled to said servomotor and rotatable thereby for moving one of said electrode tips toward and away from the other electrode tip;
   said servomotor comprising:
      a motor housing mounted on said welding gun assembly;
      a stator fixedly mounted in said motor housing; and
      a hollow rotor rotatably housed in said motor housing;
   said feed screw mechanism comprising:
      a feed screw coupled to and rotatable with said hollow rotor ; and
      a nut threaded over said feed screw for moving said one of said electrode tips toward and away from the other electrode tip in response to rotation of said feed screw ; and
      a damping member disposed in a region of contact between said hollow rotor and said nut , for absorbing shocks produced between said nut and said hollow rotor when said one of said electrode tips is moved away from the other electrode tip .

7. A motor-driven welding gun according to claim 6, wherein said damping member is of a substantially hollow cylindrical shape, said damping member having recesses which receive respective heads of screws fastening said damping member to said nut and respective heads of screws fastening a hollow rod which holds said one of said electrode tips to said nut , said damping member having a contact surface contacting said hollow rotor and extending between said recesses to an outer circumferential edge of said damping member .

* * * * *